Jan. 14, 1936.  H. COHEN  2,027,859
TAP WASHER
Filed Aug. 29, 1934
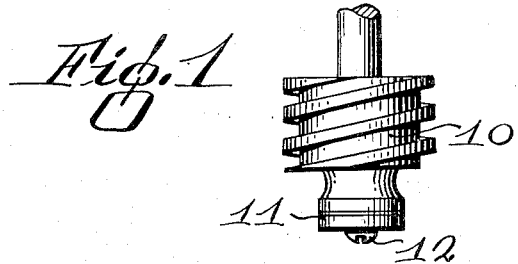
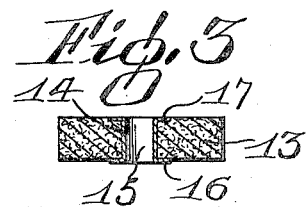
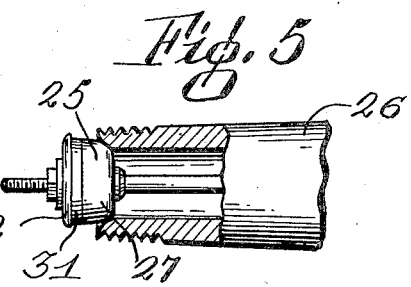
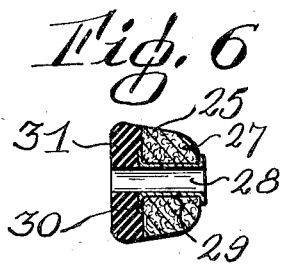
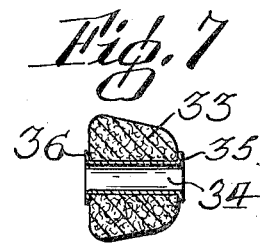
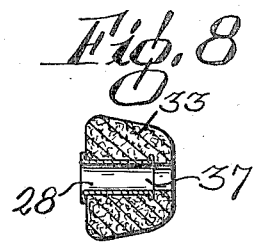
Inventor
Harry Cohen
By Raymond A. Robie
Attorney Patented Jan. 14, 1936

2,027,859

UNITED STATES PATENT OFFICE 2,027,859

TAP WASHER

Harry Cohen, Montreal, Quebec, Canada

Application August 29, 1934, Serial No. 741,962
In Canada September 1, 1933

2 Claims. (Cl. 251—160)

This invention relates to improvements in a tap washer and appertains particularly to one made from leather.

An object of the invention is to provide a tap washer that will prove more durable in use giving better and more satisfactory as well as longer service.

A further object of the invention is to provide a tap washer of leather or the like that will not crack, crumble, chip or otherwise disintegrate in the usual way under action of water or the wear and tear on the valve seat; and, though it may incline to soften, is so constructed it will remain properly in its place on the valve stem.

A further object of the invention is to provide an improved tap washer having a bushing-lined axial bore for more definitely and assuredly securing the washer on the valve stem yet preferably having a non-lined portion of the axial bore to afford a degree of cushioning resilience.

A still further object of the invention is to provide an improved tap washer of the nature and for the purpose set forth that is characterized by simplicity in design, structure and assembly and is capable of production at low cost whereby the same is rendered commercially desirable.

To the accomplishment of these and related objects as shall become apparent as the description proceeds, the invention resides in the construction, combination and arrangement of parts as shall be hereinafter fully described, illustrated in the accompanying drawing, and pointed out in the claims hereunto appended.

The invention will be best understood and can be more clearly described when reference is had to the drawing forming a part of this disclosure wherein like characters indicate like parts throughout the several views.

In the drawing:—

Figure 1 is an elevation of the conventional tap valve equipped with this improved washer;

Figures 2, 3 and 4 are vertical sections through as many various forms of the washer;

Figure 5 is a sectional elevation of a modified type of tap valve with a suitably designed washer, constructed after manner of this invention, applied thereto; and Figures 6, 7 and 8 are sections through three alternative forms of the washer for tap valves of this latter type.

Tap washers of rubber or composition material, as used today, are ordinarily hardened with some ingredient to resist the action of hot water and the wear of the tap valve seat on which they grip while tightening to closed position. These washers chip and crack and crumble and cut where they engage the valve seat rim so that the tap starts singing which further wears the loose seating valve and causes the plumbing system to vibrate and pound. By constructing the washer of leather there is much less deterioration and a minimum of wear against the valve seat since there is very little friction by the wet leather. One disadvantage may be the tendency of the leather to soften when it is wet so a bushing is carried by the usual axial bore preventing any possibility of the soft wet washer pulling off over the attaching screw. Various means of inserting and connecting this bushing are employed though it is preferably so applied that a portion of the bore of the washer remains unlined to afford a desirable degree of compressible resiliency for tightly and snugly securing the washer on the valve stem.

In Figure 1, a conventional valve stem 10 is shown, provided with one of these improved washers 11 secured by the usual screw 12. The simplest form of washer is shown in Figure 3, being composed of a flat annular disk 13 of leather with an axial bore 14 lined with a bushing 15 that is flanged, as at 16, at one end that abuts against the outer face of the leather disk 13; the other end 17 of the bushing 15 is rolled outwardly into the opposite face of the leather disk.

The washer shown in Figure 2, is the same except that a thin rubber disk 18 is applied to the inner face of the leather disk 13; its outer diameter being the same as the leather disk while its inner circumference or its axial bore 19 corresponds with the inner diameter of the bushing 15 so that the outwardly rolled inner end 17 of the bushing 15 is covered thereby. This inner facing of rubber 18 is inserted in the valve stem housing for resiliency in tightening the washer in place, does not engage the valve seat and is not subject to wear.

In the form shown in Figure 4, the leather disk 13 is the same as has been described but the bushing 20, while exteriorly flanged at the outer end 21 is not long enough to extend all the way through the axial bore 14 of leather disk 13 is that its inner end 22 when rolled outwardly sinks circumferentially into the washer 13 surrounding the bore 14. The bushing 20 is thus secured in place while yet allowing the innermost portion 23 of the bore 14 to remain unlined thereby affording the cushioning provided by the rubber facing in the previously described form.

The washer 25, used with the valve 26 is more or less conical though somewhat rounded rather than severely angular at its tapered end 27 that operates on the valve seat. It is from this inner tapered end 27 that the flanged bushing 28 is inserted in the axial bore 29 and in Figures 5 and 6 is shown as extending all the way through the leather portion and turned outwardly at the far end 30 that is then covered with a facing 31 of rubber or other resilient material. A suitable metal disk or washer 32 is included in the valve stem assembly, shown in Figure 5, to bear against this rubber faced end.

Figure 7 shows an all leather conical washer 33 of the same general outline but with a longer bushing 34 similarly flanged at its inner end 35 and extending all the way through the washer is turned outwardly at its far end 36.

In Figure 8 the same all leather washer body 33 is used but with the shorter bushing 28. This is inserted in the axial bore from the larger outer end and does not extend all the way through; its inserted end being rolled circumferentially outwards into the washer body surrounding the bore as at 37, to securely retain the bushing in place, similarly to that shown in Figure 4. In all these forms of tap washers it will be seen that the leather material alone engages the valve seat and as it moves freely thereon, there is very little tendency to cut or wear away. Furthermore it has been my desire to provide a bushing lined washer with some retained resiliency to afford a degree of cushioning when tightened in place on the valve stem.

From the foregoing description taken in connection with the accompanying drawing, it will be manifest that a tap washer is provided that will fulfil all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawing shall be interpreted as illustrative and not in a limitative or restrictive sense.

Having thus described my invention, I claim:—

1. A tap washer with an axial bore and a flanged bushing mounted therein having its flanges turned outwards over the washer, and an axially apertured resilient facing on one face of said washer and over one flange of the bushing.

2. A tap washer having a leather body for engagement with a valve seat, an axial bore in said leather body, a bushing having a flange at each end mounted in said bore, one of said flanges engaging one face of said leather body and the other flange being flush with the opposite face of said leather body, and a rubber facing on the last mentioned face of said leather body and having a central perforation equal in diameter to the interior diameter of said bushing.

HARRY COHEN.